(12) United States Patent
Pickover et al.

(10) Patent No.: US 10,380,812 B2
(45) Date of Patent: *Aug. 13, 2019

(54) VEHICLE TRANSACTION VALIDATION

(71) Applicant: International Business Machines Corporation, Armonk, NY (US)

(72) Inventors: Clifford A. Pickover, Yorktown Heights, NY (US); Komminist Weldemariam, Nairobi (KE)

(73) Assignee: International Business Machines Corporation, Armonk, NY (US)

(*) Notice: Subject to any disclaimer, the term of this patent is extended or adjusted under 35 U.S.C. 154(b) by 56 days.

This patent is subject to a terminal disclaimer.

(21) Appl. No.: 15/631,468

(22) Filed: Jun. 23, 2017

(65) Prior Publication Data

US 2018/0374283 A1    Dec. 27, 2018

(51) Int. Cl.
| | | |
|---|---|---|
| *G07C 5/08* | (2006.01) | |
| *G07C 5/12* | (2006.01) | |
| *G07C 5/00* | (2006.01) | |
| *H04L 9/06* | (2006.01) | |

(52) U.S. Cl.
CPC .............. *G07C 5/085* (2013.01); *G07C 5/006* (2013.01); *G07C 5/12* (2013.01); *H04L 9/0637* (2013.01)

(58) Field of Classification Search
CPC .......... G07C 5/085; G07C 5/006; G07C 5/12; G07C 5/00; G07C 5/08; H04L 9/0637; H04L 9/06
USPC ...................................... 711/5, 163
See application file for complete search history.

(56) References Cited

U.S. PATENT DOCUMENTS

| | | | |
|---|---|---|---|
| 2015/0206106 A1 | 7/2015 | Yago | |
| 2015/0332283 A1 | 11/2015 | Witchey | |
| 2016/0259937 A1* | 9/2016 | Ford | .................. G06F 21/554 |
| 2016/0261685 A1* | 9/2016 | Chen | .................. H04L 67/104 |
| 2017/0255966 A1* | 9/2017 | Khoury | ............... G08G 1/0129 |

(Continued)

FOREIGN PATENT DOCUMENTS

| | | | | |
|---|---|---|---|---|
| GB | 2345620 B | * | 3/2004 | .......... H04L 63/062 |
| WO | 2015024129 A1 | | 2/2015 | |

(Continued)

OTHER PUBLICATIONS

Olga Kharif, "Blockchain Goes Beyond Crypto-Currency," http://www.bloomberg.com/news/articles/2016-05-19/build-for-bitcoin-blockchain-goes-beyond-crypto-currency, Jul. 20, 2016, 5 pages.

(Continued)

*Primary Examiner* — Pierre Miche Bataille
(74) *Attorney, Agent, or Firm* — Eyal Gilboa; Ryan, Mason & Lewis, LLP

(57) ABSTRACT

A secure chain of data blocks is maintained at a given computing node, wherein the given computing node is part of a set of computing nodes in a distributed network of computing nodes, and wherein each of the set of computing nodes maintains the secure chain of data blocks. The secure chain of data blocks maintained at each computing node comprises one or more data blocks that respectively represent one or more transactions associated with a vehicle. At least one data block is added to the secure chain of data blocks maintained at the given computing node in response to determining that transaction data associated with the at least one data block is valid.

20 Claims, 8 Drawing Sheets

(56) References Cited

U.S. PATENT DOCUMENTS

2017/0310674 A1* 10/2017 Markham .......... B60R 16/0231
2018/0189449 A1* 7/2018 Karumba ............... G16H 50/30

FOREIGN PATENT DOCUMENTS

WO        2015085393 A1    6/2015
WO        2016022864 A3    2/2016

OTHER PUBLICATIONS

Arvind Krishna, "How Blockchain Will Transform Business and Society," http://www.ibm.com/blogs/think/2015/12/17/how-blockchain-will-transform-business-and-society/, Dec. 17, 2015, 11 pages.
Arvind Krishna, "Building a Smarter Planet. A Smarter Planet Blog.—Blockchain: It Really is a Big Deal," http://ibm.co/1TK0fe5, Sep. 16, 2015, 3 pages.
John Greenough, "10 Million Self-Driving Cars Will be on the Road by 2020," http://www.businessinsider.com/report-10-million-self-driving-cars-will-be-on-the-road-by-2020-2015-5-6, Jun. 15, 2016, 3 pages.
PSGS' Thoughts, "Using Block-Chains to Transfer Data," https://psgs.tk/blog/thoughts/2014/05/16/transferring-data-with-blockchains/, May 16, 2014, 6 pages.

* cited by examiner

| BLOCK 1 | BLOCK 2 | BLOCK 3 | BLOCK 4 | BLOCK 5 | ... | BLOCK N |
|---|---|---|---|---|---|---|
| VEHICLE TRANSACTION 1 | VEHICLE TRANSACTION 2 + HASH VALUE OF BLOCK 1 | VEHICLE TRANSACTION 3 + HASH VALUE OF BLOCK 2 | VEHICLE TRANSACTION 4 + HASH VALUE OF BLOCK 3 | VEHICLE TRANSACTION 5 + HASH VALUE OF BLOCK 4 | | VEHICLE TRANSACTION N + HASH VALUE OF BLOCK N-1 |

400

410

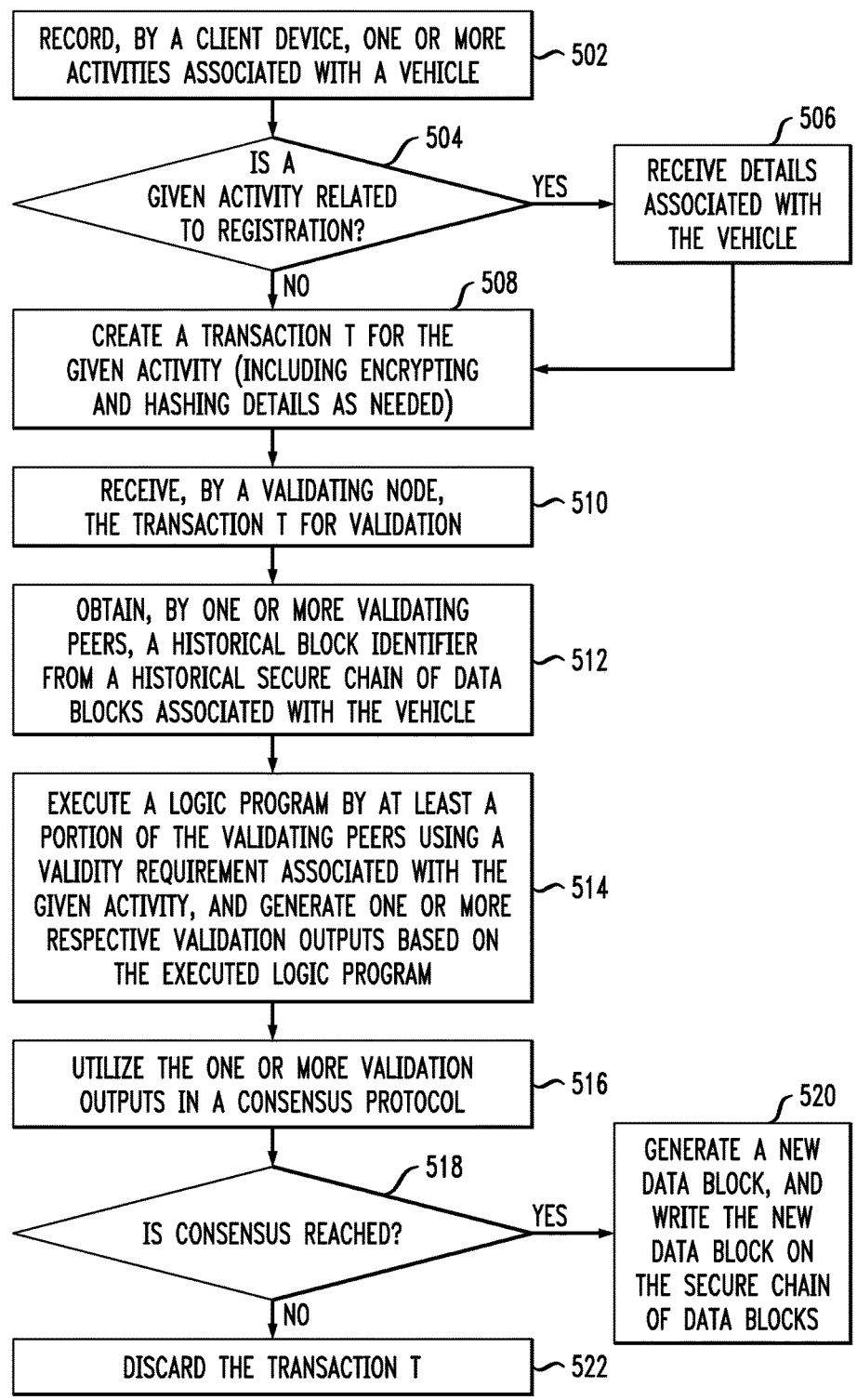

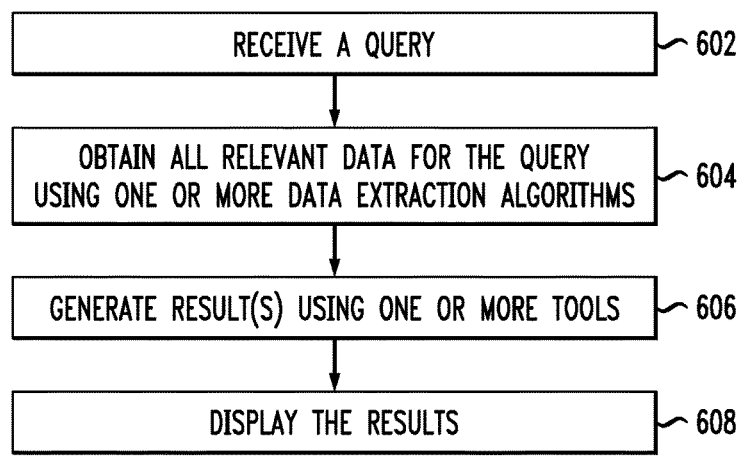
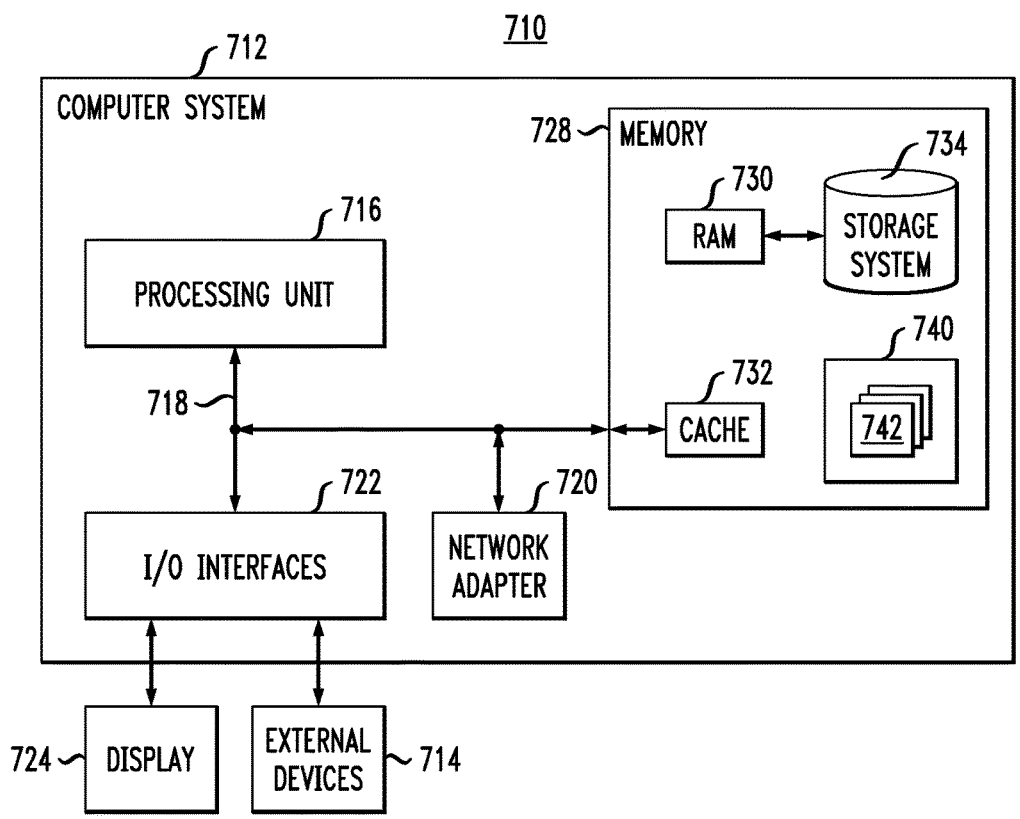

VEHICLE TRANSACTION VALIDATION

BACKGROUND

A self-driving vehicle ("SDV") is a vehicle such as, for example, a car, that is capable of operating without a human driver. An SDV determines conditions in its surrounding environment using technology such as, for example, radar, laser, odometry, global positioning system, and computer vision. One or more control systems in the SDV utilize this environmental information to control the SDV as it autonomously navigates paths and obstacles, while abiding by relevant traffic signals and signs.

SDV technology may be applied within the context of public and/or ride-sharing transportation (e.g., self-driving taxis or other types of ride-sharing vehicles). A public or ride-sharing SDV may potentially provide transportation services for a large number of passengers per day.

SUMMARY

Embodiments provide techniques for management of data associated with vehicles including SDVs (e.g., vehicles not operated by a human driver) and non-SDVs (e.g., vehicles operated by a human driver).

In one embodiment, a method comprises the following steps. A secure chain of data blocks is maintained at a given computing node, wherein the given computing node is part of a set of computing nodes in a distributed network of computing nodes, and wherein each of the set of computing nodes maintains the secure chain of data blocks. The secure chain of data blocks maintained at each computing node comprises one or more data blocks that respectively represent one or more transactions associated with a vehicle. At least one data block is added to the secure chain of data blocks maintained at the given computing node in response to determining that transaction data associated with the at least one data block is valid.

In another embodiment, an apparatus comprises at least one processor and a memory operatively coupled to the processor to form a given computing device that is part of a set of computing nodes in a distributed network of computing nodes, wherein each of the set of computing nodes maintains a secure chain of data blocks. The processor and memory are configured to: maintain the secure chain of data blocks at the given computing node, wherein the secure chain of data blocks maintained at each computing node comprises one or more data blocks that respectively represent one or more transactions associated with a vehicle; and add at least one data block to the secure chain of data blocks maintained at the given computing node in response to determining that transaction data associated with the at least one data block is valid.

In yet another embodiment, a computer program product comprises a processor-readable storage medium having encoded therein executable code of one or more software programs. The one or more software programs when executed by the one or more processors implement steps of: maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more transactions associated with a vehicle; and adding at least one data block to the secure chain of data blocks maintained at the given computing node in response to determining that transaction data associated with the at least one data block is valid.

Advantageously, illustrative embodiments provide effective techniques for tracking data related to a vehicle, such as a non-SDV or an SDV. The data may be tracked as part of a blockchain associated with the vehicle. In this manner, the various aspects of the vehicle may be chronicled, including vehicle health, driver history, various historical parameters, and passenger ratings, comments and feedback regarding the satisfaction of a public vehicle. Additionally, the passenger ratings, comments, feedback, etc. may be collected and stored in order to create a secure trail of votes/ratings that can be used to detect, correct, and prevent fraud and error in the voting/rating process. Still further, by adding additional intelligence for SDVs via secured, trusted and immutable data sources, this will, for example, increase public confidence regarding SDVs and enable the SDVs to learn from each other. By way of example only, information may be tracked with regard to passengers of the public or ride-sharing SDV that mistreat the SDV, leave belongings behind, etc.

These and other exemplary embodiments of the invention will be described in or become apparent from the following detailed description of exemplary embodiments, which is to be read in connection with the accompanying drawings.

BRIEF DESCRIPTION OF THE DRAWINGS

FIG. 3 illustrates a blockchain for according to an embodiment of the invention.

FIG. 5 illustrates a blockchain methodology for validating transaction data according to an embodiment of the invention.

FIG. 6 illustrates a methodology for providing a query service associated with a blockchain according to an embodiment of the invention.

FIG. 7 depicts a computer system in accordance with which one or more components/steps of techniques of the invention may be implemented according to an embodiment of the invention.

DETAILED DESCRIPTION

Illustrative embodiments will be described below for tracking (more generally, managing) vehicle data. While illustrative techniques described herein are particularly well-suited for tracking self-driving vehicles (SDVs), it is to be understood that embodiments are not intended to be limited to such vehicles and are more generally applicable to any vehicles including non-SDVs. Furthermore, while a "blockchain" technology will be described in one or more illustrative implementations, other types of data management technologies that generate a secure chain of data blocks maintained at computing nodes in a distributed network may be employed in one or more embodiments.

Prior to explaining the techniques for tracking vehicle data, a brief explanation of the blockchain technology will now be given.

Blockchain is the name given to a technology that enables creation of a digital ledger or record of transactions and sharing of this ledger or record among a distributed network of computers. Blockchain was originally developed as part of the bitcoin technology. Bitcoin is a digital asset and payment system. Blockchain technology uses cryptography to allow each participant on the network to manipulate the ledger in a secure way without the need for a central point of control. In the context of bitcoin, the blockchain technology maintains a public ledger of all bitcoin transactions that have previously occurred (i.e., a chain of transactions). In the bitcoin case, every compatible client is able to connect to the network, send new transactions to the network, verify transactions, and take part in the competition (called mining) to create new blocks. However, it is realized herein that blockchain technology can be adapted for other transactional applications to establish trust, accountability and transparency without requiring a central authority.

Figure 1:
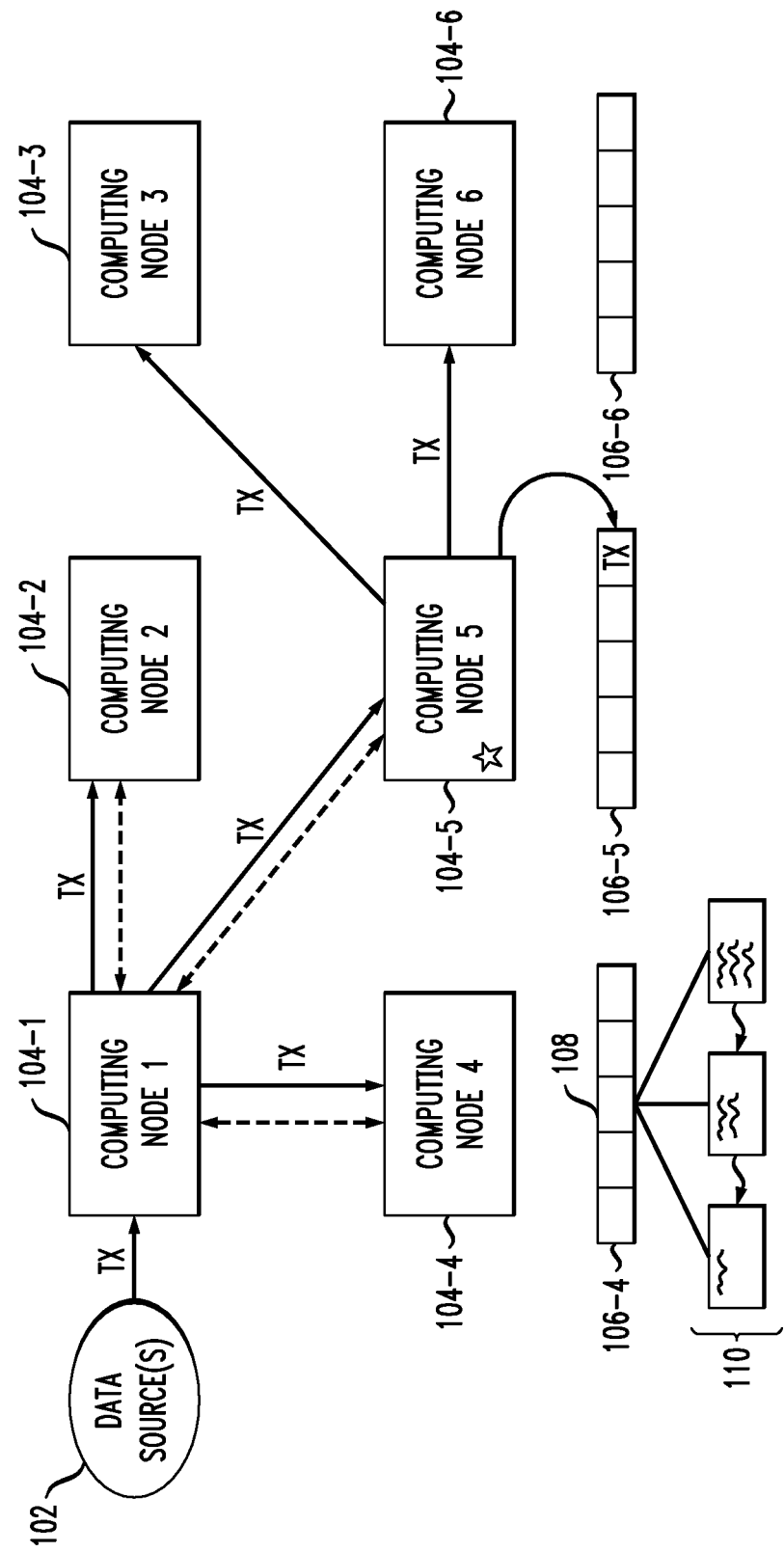
FIG. 1 illustrates a blockchain computational system with which one or more embodiments of the invention are implemented.

FIG. 1 illustrates a blockchain computational system 100 with which one or more embodiments of the invention may be implemented. As shown, the system 100 comprises one or more data sources 102 operatively coupled to at least one of a plurality of distributed peer computing nodes 104-1, 104-2, . . . , 104-6. The system 100 may have more or less computing nodes than the number illustrated in FIG. 1. Each computing node in the system 100 is configured to maintain a blockchain which is a cryptographically secured (via a cryptographic hash function) record or ledger of data blocks that represent respective transactions within some environment. A cryptographic hash function is a cryptographic function which takes an input (or "message") and returns a fixed-size alphanumeric string, which is called the hash value (sometimes called a message digest, a digital fingerprint, a digest, or a checksum).

In FIG. 1, computing nodes 104-4, 104-5, and 104-6 are shown each maintaining the same blockchain (respectively illustrated as blockchains 106-4, 106-5, and 106-6). Although not expressly shown, each computing node in the system 100 is configured to be able to maintain this same blockchain. Each blockchain is a growing list of data records hardened against tampering and revision (i.e., secure). Each block in the blockchain (illustratively referenced as block 108 in blockchain 106-4) holds batches of one or more individual transactions and the results of any blockchain executables (e.g., computations that can be applied to the transactions). Each block typically contains a timestamp and information linking it to a previous block. More particularly, each subsequent block in the blockchain (e.g., 106-4, 106-5, 106-6, etc.) is a data block that includes a given transaction and a hash value of the previous block in the chain (i.e., the previous transaction). The current transaction and the hash value of the prior transactions can itself be hashed to generate a hash value. Thus, each data block in the blockchain represents a given set of transaction data plus a set of all previous transaction data (e.g., as illustratively depicted as 110 in FIG. 1).

Assume a new set of transaction data (new transaction TX) is obtained from one of the one or more data sources 102, and received by computing node 1 (104-1). Computing node 1 (104-1) can provide the new transaction TX to all or a subset of computing nodes in the system 100. In this case, TX is sent to computing node 2 (104-2), computing node 4 (104-4), and computing node 5 (104-5).

Note that computing node 104-5 is marked with a star symbol to denote it as a leader in a consensus protocol. That is, the computing nodes in the system 100 each are configured to participate in a consensus protocol as peers with one peer being designated as a leader. Any peer can assume the role of leader for a given iteration of the consensus protocol. In general, the leader receives all transactions from the participating peers in the system and creates a new block for the new transaction. The new block is sent out by the leader node to one or more of the other peer computing nodes (e.g., 104-3 and 104-6 as illustrated in FIG. 1) which double check (validate) that the leader computed the new block properly (i.e., the validating nodes agree by consensus). If consensus is reached, then the computing nodes in the system 100 add the new block to the blockchain they currently maintain. As a result, after the new transaction TX is processed by the system 100, each computing node should now have a copy of the same updated blockchain stored in its memory. Then, when a new transaction comes into the system 100, the above-described process of adding the transaction to the blockchain is repeated.

It is to be understood that any single computing node may itself serve as the receiver, validator, and block generator for of new transaction data set. However, in the context of a consensus protocol, the more nodes that validate the given transaction, the more trustworthy the data block is considered.

It is to be further understood that the above description represents one illustrative blockchain computation process and that embodiments of the invention are not limited to the above or any particular blockchain computation implementation. As such, other appropriate cryptographic processes may be used to maintain and add to a secure chain of data blocks in accordance with embodiments of the invention.

Advantages of such a blockchain computational system include, but are not limited to: (1) the ability for independent nodes to converge on a consensus of a latest version of a large data set (e.g., a ledger), even when the nodes are run anonymously, have poor interconnectivity and may have operators who are dishonest or otherwise malicious; (2) the ability for any well-connected node to determine, with reasonable certainty, whether a transaction does or does not exists in the data set; (3) the ability for any node that creates a transaction to, after a confirmation period, determine with a reasonable level of certainty whether the transaction is valid, able to take place, and become final (i.e., that no conflicting transactions were confirmed into the blockchain elsewhere that would invalidate the transaction); (4) a prohibitively high cost to attempt to rewrite or otherwise alter transaction history; and (5) automated conflict resolution that ensures that conflicting transactions never become part of the confirmed data set.

Illustrative embodiments adapt the blockchain computational system 100 of FIG. 1 to manage data associated with vehicles, such as SDVs and non-SDVs. More particularly, as will be described in detail herein, non-limiting, illustrative embodiments apply blockchain technology to track and append data associated with a vehicle, such as vehicle parameters and vehicle activity, as transactions in the blockchain in a secure manner. Management of vehicle data is useful for chronicling at least a portion of the history of the vehicle. Each entry associated with the chronicled history of the vehicle may be embodied as a "transaction" of the blockchain.

The blockchain technology may then be used to securely maintain data about such transactions (i.e., transaction data) to establish trust, accountability and transparency with regard to vehicles without requiring a central authority.

Furthermore, as will be explained in detail herein, illustrative embodiments provide a blockchain computational system for implementing the above and other management features wherein each computing node comprises controller modules for managing transaction data and blockchain computation. More particularly, each computing node in the system is configured to track and detect vehicle data.

As such, vehicle transactions associated with a given stakeholder (someone or something that is associated with the given environment) are compiled into a chain of vehicle transaction blocks. The chain can be considered a chronicle of a vehicle's path through time. When a transaction is conducted, the corresponding vehicle parameters are sent to one or more of the computing nodes in the system for validation. The one or more computing nodes establish a validity of the transaction and generate a new block. Once the new block has been calculated, it can be appended to the stakeholder's vehicle blockchain.

Figure 2:
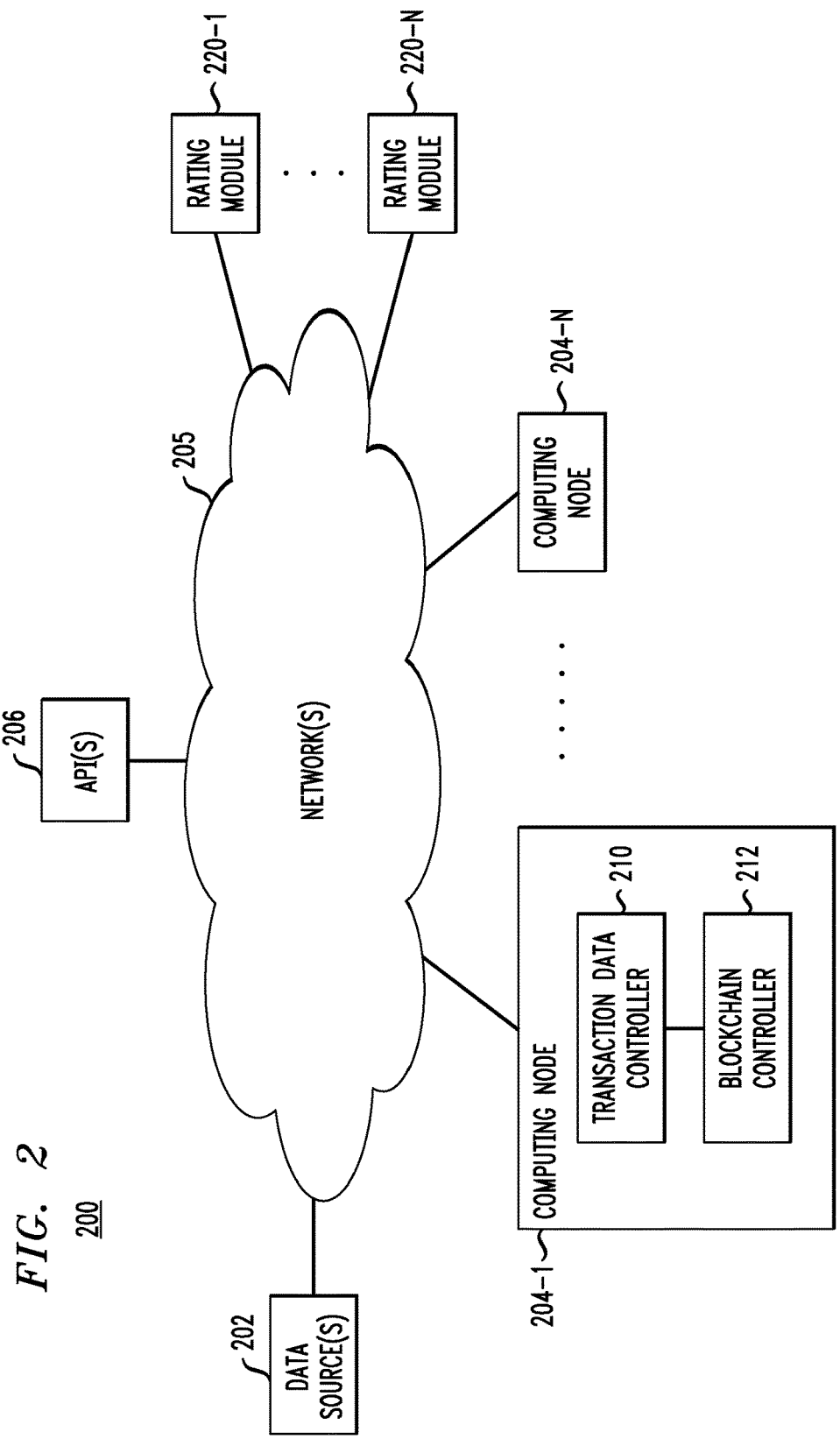
FIG. 2 illustrates a computing platform for tracking data associated with a vehicle according to an embodiment of the invention.

FIG. 2 illustrates a distributed computing platform on which a blockchain computational system (such as system 100 in FIG. 1) can be implemented. More particularly, as shown, the distributed computing platform 200 in FIG. 2 is similar to system 100 in FIG. 1 in that one or more data sources 202 are operatively coupled to a plurality of computing nodes 204-1 through 204-N. In FIG. 2, one or more communication networks 205 are shown as the mechanism for coupling the data sources 202 and the computing nodes 204-1 through 204-N.

As further shown, FIG. 2 illustrates component details of each of the computing nodes. While the component details are representatively depicted for computing node 204-1, each computing node has such components. Each computing node is configured to include a transaction data controller 210 and a blockchain controller 212. While functions of each controller will be described in greater detail below, in general: the transaction data controller 210 manages transaction data including, but not limited to, receiving or otherwise obtaining transaction data (identification data, use data, etc.); and the blockchain controller 212 manages blockchain computation including, but not limited to, accessing the transaction data and generating and validating a block and adding the block to a blockchain.

All of data representing ID, location, use (as well as other data) with respect to a given vehicle is considered transaction data in accordance with illustrative embodiments. Further, other non-limiting examples of transaction data include in-vehicle sensor data and/or in-vehicle audio/video information. For example, if the vehicle is making a sound with an amplitude above a threshold value, or with frequency properties that exceed some values, then a signal regarding this sound may be stored in the blockchain. More particularly, an alert value may be stored in the blockchain, and/or a 3-second sample of the sound waveform itself may be stored in the blockchain. Still further, transactions may include the date of fuel addition and/or the date of vehicle fluid change. One skilled in the art will realize other examples of transaction data related to a vehicle that may be tracked and managed as part of the blockchain.

Such transaction data is what is provided to any given computing node 204-1, 204-2, 204-3, 204-4, . . . , 204-N (from data source 202 or some other computing node) for use in computing a blockchain, for example, as described above in the context of FIG. 1. The transaction data controller 210 is configured to receive or otherwise obtain the transaction data for each computing node, while the blockchain controller 212 is configured to compute the blockchain for each computing node.

As discussed above in FIG. 1, at least a portion of the computing nodes may be configured to participate in a consensus protocol as peers (i.e., validating peers or validating nodes).

The distributed computing platform 200 may further support an electronic tally system. In one embodiment, the distributed computing platform 200 may further comprise a distributed network of one or more rating modules, which are represented by rating modules 220-1 through 220-N in FIG. 2. In one embodiment, each rating module may be located, for example, within a respective vehicle. Further, each rating module may be a computer system running a rating client that is associated with a network communications device. Each rating module may be configured to collect ratings, votes, comments, complaints, etc. regarding operation of the vehicle. Accordingly, the blockchain may comprise an auditable trail of ratings and a tally which can be used to detect, correct and prevent fraud and error in the rating process.

Note also that a unique identifier (UDI) or token for a vehicle may be used to form a decentralized instrument Internet of Things (IoT) network, wherein items (or things) in the network are "smart devices" that are connected to the blockchain through their corresponding UDI or token. This allows for institutional wide tracking of vehicles. Such an IoT of instruments is embodied by the computing platform 200 in FIG. 2. That is, the items (in this case, vehicles) are trackable through the network(s) 205 that operatively couple the computing nodes that store the blockchain.

On top of providing trusted data, distributed computing platform 200 may provide for the implementation of various intelligent services, such as historic opinion trend of an item, historic sentiment of an item, etc. In one embodiment, and as shown in FIG. 2, these services may be available as built-in functions via one or more application programming interfaces (APIs) 206 for application developers. For example, the API(s) 206 may comprise one or more representational state transfer (RESTful) APIs. In illustrative embodiments, built-in functions include, for example, History( ) and Journey( ). History( ) takes the token associated with the vehicle as input, and returns activity related to the vehicle (e.g., a history of the vehicle, repair or health status of the vehicle, accident history of the vehicle, ratings associated with the vehicle, etc.). Journey( ) takes the token associated with the vehicle and a time T as inputs, and returns a journey map of the vehicle over time T. The Journey( ) function is useful, for example, in the context of car tracking.

Given the above-described examples of transaction data (e.g., described in the context of FIGS. 1 and 2), FIG. 3 illustrates a blockchain 300 for tracking transactions related to a vehicle, according to an embodiment of the invention. Each computing node in the computing platform 200 is configured to compute blockchain 300. As shown, each block (after block 1) includes a new vehicle transaction plus a hash value computed for the previous block. Thus, each data block in the blockchain represents a given set of transaction data plus a set of all previous transaction data, e.g., block N contains data for vehicle transaction N plus a hash value that represents all previous N−1 blocks. Alternatively, each block may contain a hash value of the combination of the new transaction for that block plus the hash value of the previous block. Alternative block content implementations may be employed in other embodiments.

Figure 4A:
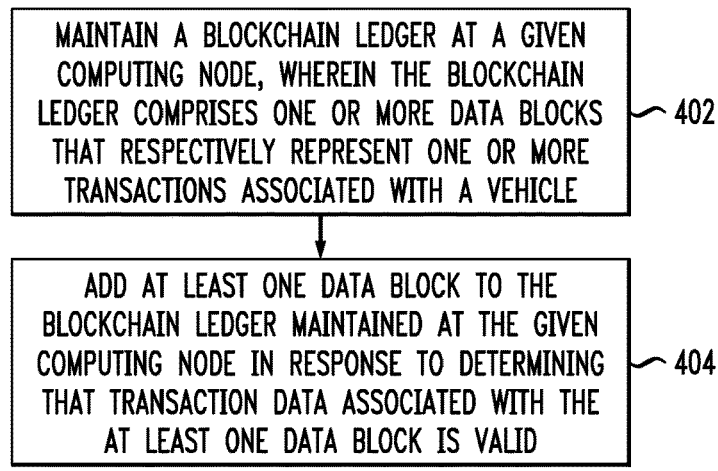
FIG. 4A illustrates a blockchain methodology for tracking data associated with a vehicle according to an embodiment of the invention.

FIG. 4A illustrates a blockchain methodology 400 for tracking activities associated with a vehicle to a secure chain of data blocks, according to an embodiment of the invention. This methodology 400 can be performed by each computing node in the computing platform 200. In step 402, a blockchain ledger (also referred to herein simply as blockchain) is maintained at a given computing node. In one embodiment, the secure chain of data blocks is a blockchain ledger, as discussed above with reference to FIGS. 1-3. The blockchain ledger comprises one or more data blocks that respectively represent one or more transactions associated with a vehicle. Note that, in illustrative embodiments described herein, step 402 is performed by the blockchain controller 212 based on transaction data obtained through the transaction data controller 210. In step 404, a data block is added to the blockchain ledger maintained at the given computing node (e.g., via the blockchain controller 212) in response to determining that transaction data associated with the at least one data block is valid.

Figure 4B:
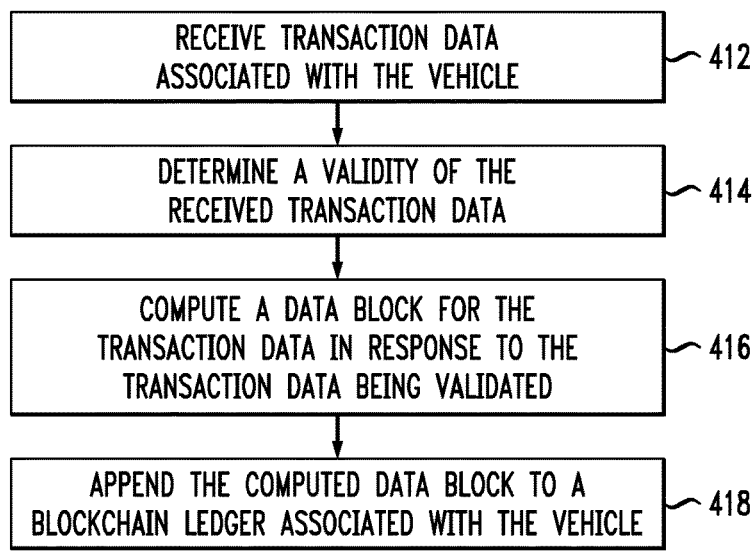
FIG. 4B illustrates a blockchain methodology for adding transaction data to a blockchain according to an embodiment of the invention.

FIG. 4B illustrates a methodology 410 for adding data to a blockchain that is used to track a vehicle according to an embodiment of the invention. The methodology 410 is a more detailed example of step 404 in FIG. 4A. As shown, in step 412, a computing node in the computing platform 200 receives transaction data associated with the vehicle. In step 414, a computing node in the computing platform 200 determines a validity of the received transaction data. In step 416, a computing node in the computing platform 200 computes a data block for the transaction data in response to the transaction data being validated. In step 418, a computing node in the computing platform 200 appends the computed data block to a blockchain ledger associated with the vehicle.

It is to be appreciated that each step of methodology 410 can be performed at the same computing node or the one or more steps can be separately performed at different computing nodes. That is, depending on the consensus protocol used (assuming one is used), the steps are distributively performed across the computing platform 200 or within each computing node. The result is that each computing node preferably maintains the same updated blockchain for the vehicle.

FIG. 5 illustrates a blockchain methodology 500 for validating received transaction data according to an embodiment of the invention. This methodology 500 can be performed by each computing node in the computing platform 200.

At step 502, one or more activities associated with a vehicle are performed and recorded by a client device. The vehicle may be a non-SDV or an SDV. The activities associated with the vehicle may include, but are not limited to, one or more of registering the vehicle for the first time, updating the repair history of the vehicle, receiving a passenger rating of the vehicle, uploading data associated with the vehicle, etc. The client device may be, for example, SDV, SDV owner, renter device, customer of SDV, non-SDV, etc. The one or more activities may be signed and/or encrypted and sent to a blockchain system.

As discussed above with reference to FIG. 2, at least one passenger rating of the vehicle may be received via a rating module comprised within a distributed network of one or more rating modules. The rating module may be configured to collect ratings, votes, comments, complaints, etc. given by the passenger to provide feedback regarding the vehicle. This feature is particularly useful in the context of a public or ride-sharing transportation setting. In one embodiment, the rating module is located within the vehicle. The rating module may be a rating machine running a rating client. Accordingly, the blockchain may comprise an auditable trail of passenger ratings and a tally which can be used to detect, correct and prevent fraud and error in the rating process.

The data associated with the vehicle may include current location data, route taken data, etc. In one embodiment, an automatic vehicle location device/sensor may upload this data. This data may be useful in addressing criminal activity, such as preventing fraud, vehicle thefts, illegal vehicle sales, etc.

At step 504, it is determined if a given one of the recorded activities is related to registration. If yes, the process proceeds to step 506, at which details associated with the vehicle are received. These details may be uploaded manually by the owner of the vehicle, or may be automatically uploaded. Examples of details related to the vehicle that may be received at step 506 may include, but are not limited to, one or more of license plate number, owner information, the date the vehicle was first registered, vehicle color, vehicle engine size, year of vehicle manufacture, vehicle carbon dioxide ($CO_2$) emissions, vehicle tax rate, image of the vehicle, current and/or past driving history of drivers, etc.

If the registration at step 504 is a first registration, step 506 may further comprise assigning a (electronic) token to the vehicle (which may also be provided to the owner of the vehicle). From there, any transaction related to the vehicle always includes the token assigned to the vehicle. Thus, any authorized entity (e.g., owner, buyer, renter, other vehicle, computer program) may verify the identity of the vehicle, as long as the authorized entity presents the token associated with the vehicle.

After step 506, or if it is not determined at step 504 that the given activity is related to registration, the process proceeds to step 508 to create a transaction T for the given activity. In one embodiment, creating the transaction may include encrypting and/or hashing the details, as needed.

At step 510, a validating node receives the transaction T for validation. It is to be appreciated that a validating node (device/peer) may be one of the computing nodes in computer platform 200.

At step 512, one or more validating devices/nodes (i.e., validating peers) obtain a historical block identifier from a vehicle historical blockchain. The vehicle historical blockchain may represent a chronicle of activities associated with the vehicle, such as the particular rating, vehicle history, historic driving logs of drivers, etc.

In one embodiment, the validating peers may be based on open blockchain technology (i.e., based on the principle of a permissioned network). In another embodiment, the validating peers may be based on a permission-less blockchain technology, where the validating peers establish a validity of the transaction and generate a new block via a "proof-of-work" principle. Although the methodology described herein in FIG. 5 focuses on the use of validating peers based on open blockchain technology, the principles described herein may be applied to validating peers based on permission-less blockchain technology.

At step 514, a logic program is executed using a validity requirement, and one or more validation outputs are generated based on the executed logic program. In one embodiment, the logic program is a program comprising one or more chain codes. The one or more chain codes may be employed to track or validate user-generated transactions associated with the vehicle. In one embodiment, at least a portion of the validating peers execute the one or more chain codes, and generate respective validation outputs. The one or more chain codes may be computer programs deployed at each validating peer. In one embodiment, the at least a portion of the validating peers comprises all of the validating peers. The user may be, for example, a customer, mechanic, or other user of the vehicle.

The validity requirement may be received with respect to, for example, passenger rating, feedback or comments, vehicle behavior, driving actions indicating criteria that must be met in order for the validation system to accept a validation event with respect to the transaction T, etc. In one embodiment, the validity requirement is encoded in the logic program. Additional data may be encoded in the logic program as well. For example, regulations and/or standards (e.g., road/traffic safety and law enforcement) may be encoded in the logic program to validate the vehicle behavior with respect to these regulations and/or standards.

At step 516, the validation outputs generated by the validating peers are received by a consensus algorithm.

At step 518, it is determined if consensus has been reached. If yes, a new block is written to the blockchain at step 520. However, if a consensus has not been reached, the transaction T is discarded at step 522. Accordingly, only validated transactions associated with activities associated with a vehicle are added to the blockchain associated with the vehicle.

FIG. 6 illustrates a methodology 600 for providing query service associated with a blockchain, according to an embodiment of the present invention. As shown, at step 602, the blockchain system receives a query. In one embodiment, a client device generates the query and sends the query to the blockchain system. The query may comprise one or more of a count rating query, a fake rating query, a sentiment query, a feature query and a cohort query. At step 604, the data associated with the blockchain is obtained using one or more (intelligent) data extraction algorithms. At step 606, one or more results are generated using one or more tools, and the one or more results are sent to the client device in satisfaction of the query. In one embodiment, the one or more tools include one or more analytic algorithms and one or more built-in functions via one or more application programming interfaces (APIs) (e.g., Restful APIs). Examples of built-in functions include, for example, History( ) and Journey( ). At step 608, the results are displayed on a dashboard at the client device.

Illustrative embodiments described herein store data associated with a vehicle in a blockchain system, where any data transaction is managed by consensus. Each vehicle and driver may be a registered member through a blockchain membership system. In one embodiment, the blockchain membership system is a public key infrastructure (PKI) system. PKI refers to a set of roles, policies and procedures for creating, managing, distributing, using, storing and revoking digital certificates, and managing public-key encryption. PKI generates the right public-private key pair to be associated to each vehicle/driver. In this way, any data uploaded to the blockchain associated with the vehicle may be signed using the private key associated with the vehicle.

Many advantages are realized through the blockchain computational system described herein. For example, ride-sharing services may utilize embodiments described herein to track information associated with vehicles, customer ratings, feedback, reviews, etc. Similarly, rental car companies may utilize embodiments described herein to monitor the health, status, condition, behavior, etc. of their vehicles by querying the blockchain of their vehicles. In some embodiments, a vehicle may be part of an IoT network. In these embodiments, the vehicle may access traffic information, collect information about the road, such as road conditions and hazards (e.g., potholes, speedbumps), and upload the collected information into the blockchain associated with the vehicle.

The blockchain computational system described herein may also be used to facilitate a variety of services, including but not limited to: (1) lock in attribution by creating a permanent and unbreakable link between a vehicle and its transactions/traversals; (2) secure sharing of transactions/traversals with other interested parties by transferring or copying a transaction/traversal record; (3) increase visibility by helping trace where and how vehicle transactions/traversals spread through a region (i.e., by showing all locations that the vehicle has appeared and/or all of the transactions/traversals the vehicle had over time); (4) certificate of authenticity (CoA) functionality (e.g., each registered transaction/traversal may come with a CoA, a built-in unique cryptographic ID and the complete transaction history, so that the CoA can be verified at any time and/or printed out); (5) limited digital edition creation; and (6) work licensing by helping users transfer, consign or loan information without losing attribution.

One or more embodiments can make use of software running on a computer or workstation. With reference to FIG. 7, in a computing node 710 there is a system/server 712, which is operational with numerous other general purpose or special purpose computing system environments or configurations. Examples of well-known computing systems, environments, and/or configurations that may be suitable for use with system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each computing node in the computing platform 200 can implement the architecture shown in computing node 710.

System/server 712 may be described in the general context of computer system executable instructions, such as program modules, being executed by a computer system. Generally, program modules may include routines, programs, objects, components, logic, data structures, and so on that perform particular tasks or implement particular abstract data types. System/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, system/server 712 is shown in the form of a computing device. The components of system/server 712 may include, but are not limited to, one or more processors or processing units 716, system memory 728, and bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

System/server 712 typically includes a variety of computer system readable media. Such media may be any available media that is accessible by system/server 712, and it includes both volatile and non-volatile media, removable and non-removable media.

The system memory 728 can include computer system readable media in the form of volatile memory, such as random access memory (RAM) 730 and/or cache memory 732.

System/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces.

As depicted and described herein, memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

System/server 712 may also communicate with one or more external devices 714 such as a keyboard, a pointing device, an external data storage device (e.g., a USB drive), display 724, one or more devices that enable a user to interact with system/server 712, and/or any devices (e.g., network card, modem, etc.) that enable system/server 712 to communicate with one or more other computing devices. Such communication can occur via I/O interfaces 722. Still yet, system/server 712 can communicate with one or more networks such as a LAN, a general WAN, and/or a public network (e.g., the Internet) via network adapter 720. As depicted, network adapter 720 communicates with the other components of system/server 712 via bus 718. It should be understood that although not shown, other hardware and/or software components could be used in conjunction with system/server 712. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
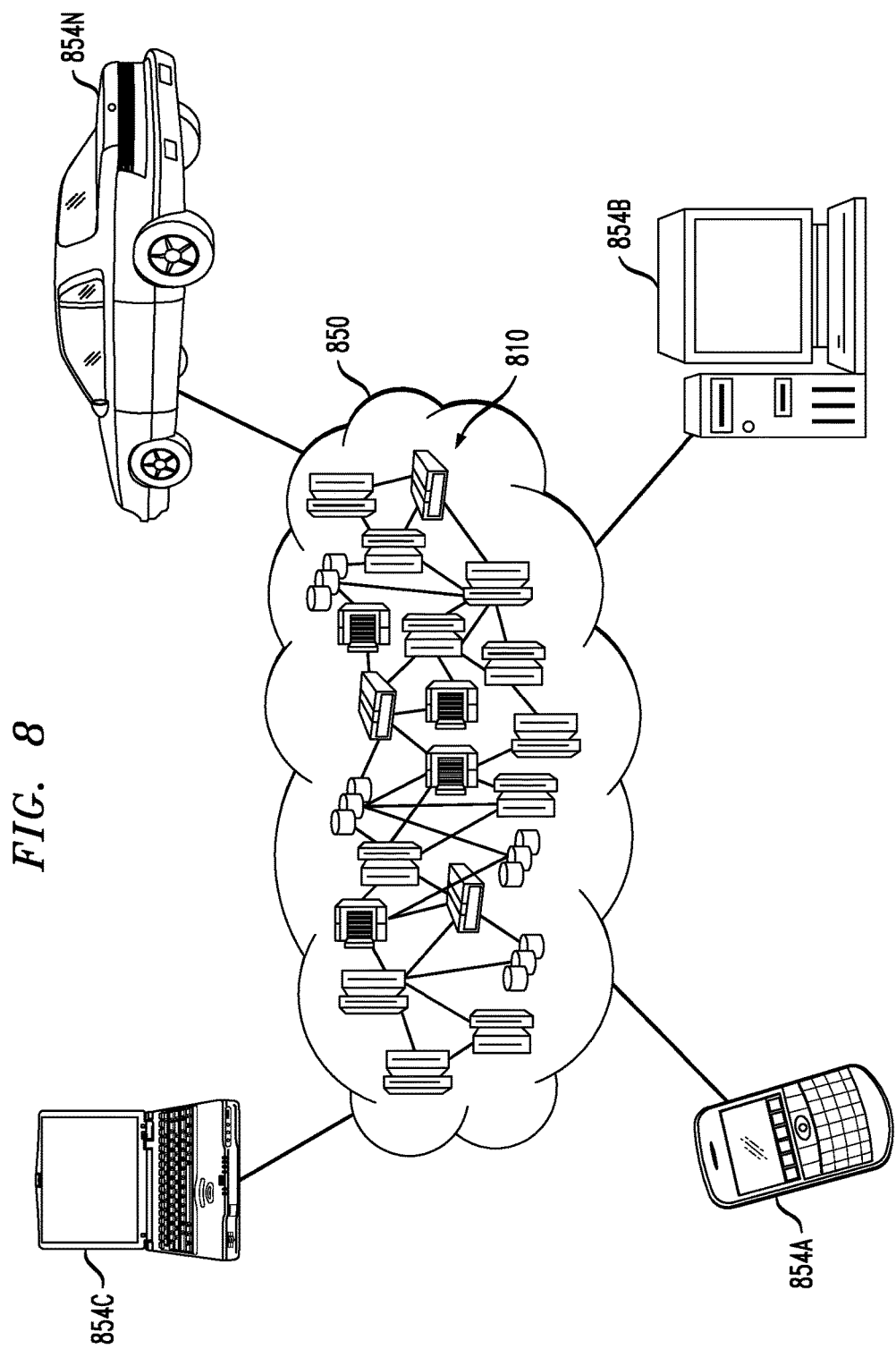
FIG. 8 depicts a cloud computing environment according to an embodiment of the invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
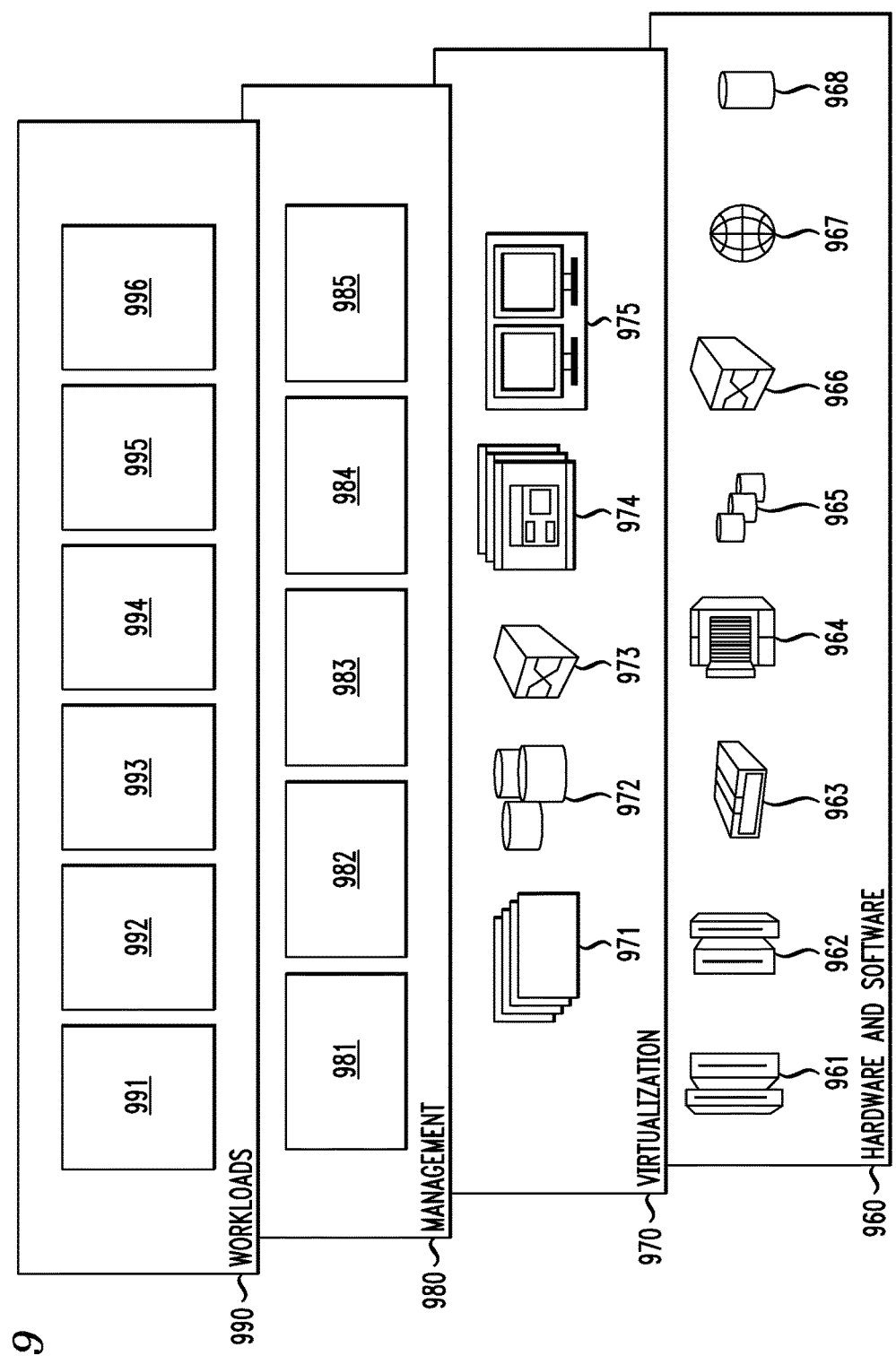
FIG. 9 depicts abstraction model layers according to an embodiment of the invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: transaction data capture 991; blockchain computation 992; data analytics processing 993; risk assessment 994; alert processing 995; and ameliorative/corrective/remedial action implementation 996, which may perform various functions described above.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus, comprising:
   at least one processor; and
   a memory operatively coupled to the processor to form a given computing device that is part of a set of computing nodes in a distributed network of computing nodes wherein each of the set of computing nodes maintains a secure chain of data blocks, the processor and memory configured to:
   maintain the secure chain of data blocks at the given computing node, wherein the secure chain of data blocks maintained at each computing node comprises one or more data blocks that respectively represent one or more transactions associated with a driven vehicle; and
   add at least one data block to the secure chain of data blocks maintained at the given computing node in response to determining that transaction data associated with the at least one data block is valid;
   wherein the one or more transactions associated with the vehicle comprises at least uploading data associated with the vehicle.

2. A method, comprising:
   maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more transactions associated with a driven vehicle; and
   adding at least one data block to the secure chain of data blocks maintained at the given computing node in response to determining that transaction data associated with the at least one data block is valid;

wherein the one or more transactions associated with the vehicle comprises at least uploading data associated with the vehicle; and wherein the maintaining and adding steps are implemented via at least one processor operatively coupled to a memory associated with the given computing node.

3. The method of claim 2, wherein the one or more transactions associated with the vehicle comprise one or more of: registering the vehicle for a first time, updating a repair history of the vehicle, receiving a passenger rating of the vehicle, fueling the vehicle, and servicing the vehicle.

4. The method of claim 3, wherein the passenger rating of the vehicle is received via a rating module comprised within a distributed network of one or more rating modules.

5. The method of claim 4, wherein the rating module is located within the vehicle.

6. The method of claim 2, wherein the secure chain of data blocks comprises data associated with one or more of health or repair path through the life of the vehicle, driver history of the vehicle, history parameters related to the vehicle, in-vehicle sensor data, in-vehicle audio/video information, and passenger ratings of the vehicle.

7. The method of claim 2, wherein the vehicle is one of a self-driving vehicle (SDV) and a non-SDV.

8. The method of claim 2, wherein the secure chain of data blocks represents a transaction path of the activities associated with the vehicle through time.

9. The method of claim 2, wherein the adding step further comprises the given computing node:

receiving transaction data associated with the vehicle;

determining a validity of the received transaction data;

computing a new data block for the transaction data in response to the transaction data being validated; and appending the computed data block to the secure chain of data blocks maintained at the given computing node.

10. The method of claim 9, wherein the received transaction data is one or more of encrypted and hashed prior to being validated.

11. The method of claim 9, wherein validating the received transaction data comprises:

obtaining a block identifier from the secure chain of data blocks;

executing a logic program using a validity requirement; and generating one or more validation outputs based on the executed logic program, wherein the one or more validation outputs are utilized in a consensus protocol.

12. The method of claim 11, wherein the one or more validity requirements are embedded within the logic program.

13. The method of claim 11, wherein the logic program comprises one or more chain codes.

14. The method of claim 11, wherein the new data block is computed in response to the consensus protocol determining that a consensus has been reached.

15. The method of claim 11, further comprising discarding the received transaction data in response to the consensus protocol determining that a consensus has failed to be reached.

16. A computer program product comprising a processor-readable storage medium having encoded therein executable code of one or more software programs, wherein the one or more software programs when executed by the one or more processors implement steps of:

maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more transactions associated with one or more activities associated with a driven vehicle; and adding at least one data block to the secure chain of data blocks maintained at the given computing node in response to determining that transaction data associated with the at least one data block is valid;

wherein the one or more transactions associated with the vehicle comprises at least uploading data associated with the vehicle.

17. The computer program product of claim 16, wherein the secure chain of data blocks represents a transaction path of the activities associated with the vehicle through time.

18. The computer program product of claim 16, wherein the adding step further comprises the given computing node:

receiving transaction data associated with the vehicle;

determining a validity of the received transaction data;

computing a new data block for the transaction data in response to the transaction data being validated; and appending the computed data block to the secure chain of data blocks maintained at the given computing node.

19. The computer program product of claim 18, wherein determining a validity of the received transaction further comprises:

obtaining a historical block identifier associated with the vehicle;

executing a logic program using the historical block identifier from the secure chain of data blocks and one or more validity requirements associated with the given activity; and generating one or more respective validation outputs based on the executed logic program;

wherein the one or more validation outputs are utilized in a consensus protocol.

20. The computer program product of claim 19, wherein the new data block is computed in response to the consensus protocol determining that a consensus has been reached, and further comprising discarding the received transaction data in response to the consensus protocol determining that a consensus has failed to be reached.

* * * * *